United States Patent
Blaker et al.

(10) Patent No.: US 8,264,333 B2
(45) Date of Patent: Sep. 11, 2012

(54) TRAINABLE REMOTE CONTROLLER AND METHOD FOR DETERMINING THE FREQUENCY OF A LEARNED CONTROL SIGNAL

(75) Inventors: David A. Blaker, Holland, MI (US); Loren D. Vredevoogd, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 623 days.

(21) Appl. No.: 10/546,137

(22) PCT Filed: Feb. 23, 2004

(86) PCT No.: PCT/US2004/005257
§ 371 (c)(1),
(2), (4) Date: Aug. 19, 2005

(87) PCT Pub. No.: WO2004/077729
PCT Pub. Date: Sep. 10, 2004

(65) Prior Publication Data
US 2006/0181428 A1    Aug. 17, 2006

Related U.S. Application Data

(60) Provisional application No. 60/448,993, filed on Feb. 21, 2003.

(51) Int. Cl.
*G05B 11/01* (2006.01)
(52) U.S. Cl. .................................................. 340/12.22
(58) Field of Classification Search ............... 340/825.2, 340/5.61, 5.71, 5.7, 825.72, 825.69
See application file for complete search history.

(56) References Cited

U.S. PATENT DOCUMENTS

| 4,529,980 | A | 7/1985 | Liotine et al. |
| 4,535,333 | A | 8/1985 | Twardowski |
| 4,750,118 | A | 6/1988 | Heitschel et al. |
| 4,866,434 | A | 9/1989 | Keenan |

(Continued)

FOREIGN PATENT DOCUMENTS

EP    1 052 608 A1    11/2000

(Continued)

OTHER PUBLICATIONS

International Search Report for International Application No. PCT/US03/35641, mailed Mar. 6, 2004, 4 pages.

(Continued)

*Primary Examiner* — Vernal Brown
(74) *Attorney, Agent, or Firm* — Foley & Lardner LLP

(57) ABSTRACT

A trainable transceiver for learning signal characteristics of an RF control signal received from a remote control transmitter used to remotely actuate a device and for subsequently transmitting a modulated RF signal having the learned signal characteristics includes an antenna, a wideband receiver and a control circuit. The wideband receiver is coupled to the antenna and is configured to receive an RF control signal from the remote control transmitter. The RF control signal includes a control code, a set of data characteristics and an RF carrier frequency. The control circuit is coupled to the wideband receiver and has a training mode in which the control circuit is configured to identify and store the control code of the RF control signal, to identify at least one data characteristic from the set of data characteristics and to identify at least one RF frequency associated with the RF control signal based on the at least one data characteristic.

28 Claims, 6 Drawing Sheets

U.S. PATENT DOCUMENTS

| | | | |
|---|---|---|---|
| 4,931,789 A | 6/1990 | Pinnow | |
| 4,988,992 A | 1/1991 | Heitschel et al. | |
| 5,379,453 A | 1/1995 | Tigwell | |
| 5,442,340 A | 8/1995 | Dykema | |
| 5,475,366 A | 12/1995 | Van Lente et al. | |
| 5,479,155 A | 12/1995 | Zeinstra et al. | |
| 5,563,600 A | 10/1996 | Miyake | |
| 5,583,485 A | 12/1996 | Van Lente et al. | |
| 5,596,316 A | 1/1997 | Honeck | |
| 5,614,885 A | 3/1997 | Van Lente et al. | |
| 5,614,891 A | 3/1997 | Zeinstra et al. | |
| 5,614,906 A | 3/1997 | Hayes et al. | |
| 5,619,190 A | 4/1997 | Duckworth et al. | |
| 5,627,529 A | 5/1997 | Duckworth et al. | |
| 5,646,701 A | 7/1997 | Duckworth et al. | |
| 5,661,651 A | 8/1997 | Geschke et al. | |
| 5,661,804 A | 8/1997 | Dykema et al. | |
| 5,680,134 A | 10/1997 | Tsui | |
| 5,686,903 A | 11/1997 | Duckworth et al. | |
| 5,699,054 A | 12/1997 | Duckworth | |
| 5,699,055 A | 12/1997 | Dykema et al. | |
| 5,708,415 A | 1/1998 | Van Lente et al. | |
| 5,758,300 A | 5/1998 | Abe | |
| 5,774,064 A | 6/1998 | Lambropoulos et al. | |
| 5,790,948 A | 8/1998 | Eisfeld et al. | |
| 5,793,300 A | 8/1998 | Suman et al. | |
| 5,810,420 A | 9/1998 | Welling | |
| 5,841,390 A | 11/1998 | Tsui | |
| 5,844,473 A | 12/1998 | Kaman | |
| 5,854,593 A * | 12/1998 | Dykema et al. | 340/825.22 |
| 5,903,226 A | 5/1999 | Suman et al. | |
| 5,926,087 A | 7/1999 | Busch et al. | |
| 5,990,828 A | 11/1999 | King | |
| 5,995,898 A | 11/1999 | Tuttle | |
| 6,005,508 A | 12/1999 | Tsui | |
| 6,008,735 A | 12/1999 | Chiloyan et al. | |
| 6,020,829 A | 2/2000 | Hörmann | |
| 6,021,319 A | 2/2000 | Tigwell | |
| 6,023,241 A | 2/2000 | Clapper | |
| 6,055,468 A | 4/2000 | Kaman et al. | |
| 6,072,404 A | 6/2000 | Nolan et al. | |
| 6,078,271 A * | 6/2000 | Roddy et al. | 340/825.72 |
| 6,091,330 A | 7/2000 | Swan et al. | |
| 6,091,343 A | 7/2000 | Dykema et al. | |
| 6,127,922 A | 10/2000 | Roddy et al. | |
| 6,127,961 A | 10/2000 | Stacy et al. | |
| 6,131,019 A | 10/2000 | King | |
| 6,137,421 A | 10/2000 | Dykema | |
| 6,144,114 A | 11/2000 | Chutorash | |
| 6,154,148 A | 11/2000 | Fluharty et al. | |
| 6,160,319 A | 12/2000 | Marougi et al. | |
| 6,181,255 B1 | 1/2001 | Crimmins et al. | |
| 6,188,889 B1 | 2/2001 | Tsai | |
| 6,191,701 B1 | 2/2001 | Bruwer | |
| 6,249,673 B1 | 6/2001 | Tsui | |
| 6,265,987 B1 | 7/2001 | Wang et al. | |
| 6,271,765 B1 | 8/2001 | King et al. | |
| 6,271,815 B1 | 8/2001 | Yang et al. | |
| 6,275,379 B1 | 8/2001 | Quinno et al. | |
| 6,308,083 B2 | 10/2001 | King | |
| 6,333,698 B1 | 12/2001 | Roddy | |
| 6,337,173 B2 | 1/2002 | Jen et al. | |
| 6,377,173 B1 | 4/2002 | Desai | |
| 6,396,408 B2 | 5/2002 | Drummond et al. | |
| 6,426,706 B1 | 7/2002 | King | |
| 6,472,885 B1 | 10/2002 | Green et al. | |
| 6,486,795 B1 | 11/2002 | Sobel et al. | |
| 6,512,461 B1 | 1/2003 | Benzie et al. | |
| 6,525,645 B2 | 2/2003 | King et al. | |
| 6,556,681 B2 | 4/2003 | King | |
| 6,556,813 B2 * | 4/2003 | Tsui | 455/92 |
| 6,559,775 B1 | 5/2003 | King | |
| 6,593,856 B1 | 7/2003 | Madau | |
| 6,703,941 B1 | 3/2004 | Blaker | |
| 6,724,339 B2 | 4/2004 | Conway et al. | |
| 6,747,568 B1 | 6/2004 | Teskey | |
| 6,822,603 B1 | 11/2004 | Crimmins et al. | |
| 7,050,794 B2 | 5/2006 | Chuey et al. | |
| 7,254,182 B2 | 8/2007 | Tsui | |
| 2001/0007086 A1 | 7/2001 | Rogers et al. | |
| 2001/0035811 A1 | 11/2001 | Dewan | |
| 2002/0034303 A1 | 3/2002 | Farris et al. | |
| 2002/0113686 A1 | 8/2002 | Shannon Carravallah | |
| 2002/0140569 A1 | 10/2002 | Van Ee et al. | |
| 2002/0163440 A1 | 11/2002 | Tsui | |
| 2002/0191794 A1 | 12/2002 | Farris et al. | |
| 2003/0016139 A1 | 1/2003 | Teich | |
| 2003/0033540 A1 | 2/2003 | Fitzgibbon | |
| 2003/0112121 A1 | 6/2003 | Wilson | |
| 2003/0118187 A1 | 6/2003 | Fitzgibbon | |
| 2003/0153306 A1 | 8/2003 | Study et al. | |
| 2003/0197595 A1 | 10/2003 | Olson et al. | |
| 2003/0216139 A1 | 11/2003 | Olson et al. | |
| 2004/0017292 A1 | 1/2004 | Reese et al. | |
| 2004/0066277 A1 | 4/2004 | Murray et al. | |
| 2004/0100391 A1 | 5/2004 | Guthrie | |
| 2005/0024184 A1 | 2/2005 | Chuey | |
| 2005/0024185 A1 | 2/2005 | Chuey | |
| 2005/0024229 A1 | 2/2005 | Chuey | |
| 2005/0024230 A1 | 2/2005 | Chuey | |
| 2005/0024254 A1 | 2/2005 | Chuey | |
| 2005/0024255 A1 | 2/2005 | Chuey | |
| 2005/0026601 A1 | 2/2005 | Chuey | |
| 2005/0026602 A1 | 2/2005 | Chuey et al. | |
| 2005/0026605 A1 | 2/2005 | Guthrie et al. | |
| 2005/0046545 A1 | 3/2005 | Skekloff et al. | |

FOREIGN PATENT DOCUMENTS

| | | |
|---|---|---|
| EP | 1 267 111 A1 | 12/2002 |
| EP | 1 129 441 B1 | 5/2003 |
| FR | 2792444 A1 | 10/2000 |
| FR | 2819358 A1 | 7/2002 |
| GB | 2 325 552 A | 11/1998 |
| WO | WO 99/63308 A1 | 12/1999 |
| WO | WO 99/64274 A1 | 12/1999 |
| WO | WO 00/12850 A1 | 3/2000 |
| WO | WO 00/70577 A1 | 11/2000 |
| WO | WO 02/080129 A2 | 10/2002 |
| WO | WO 2004/034352 A1 | 4/2004 |
| WO | WO 2004/036526 A2 | 4/2004 |
| WO | WO 2004/043750 A2 | 5/2004 |
| WO | WO 2004/066514 A1 | 8/2004 |
| WO | WO 2004/077729 A2 | 9/2004 |
| WO | WO 2004/104966 A2 | 12/2004 |
| WO | WO 2005/002080 A1 | 1/2005 |

OTHER PUBLICATIONS

International Search Report for International Application No. PCT/US2004/005257, mailed Jul. 9, 2004, 3 pages.

International Search Report for International Application No. PCT/US2004/015886, mailed Oct. 12, 2004, 3 pages.

IP Receiver for High Data Rate PCM at 455 kHz, Visay TSOP7000, Document No. 82147, Rev. 4, Mar. 29, 2001, 7 pages.

Marantec America Accessories Listing, Sep. 30, 2002, 3 pages.

Marantec America Openers With a Difference Listing, Sep. 30, 2002, 2 pages.

Marantec Expands Its Line of Radio Controls by Introducing the HomeLink Compatible 315MHz Modular Frequency System, Marantec America News, Sep. 30, 2002, 3 pages.

Notice of Allowance for U.S. Appl. No. 10/531,108, dated Sep. 7, 2010, 4 pages.

Office Action for U.S. Appl. No. 10/531,108, dated Aug. 31, 2009, 7 pages.

Office Action for U.S. Appl. No. 10/531,108, mailed Mar. 19, 2010, 8 pages.

Office Action for U.S. Appl. No. 10/533,919, dated Apr. 9, 2009, 9 pages.

Office Action for U.S. Appl. No. 10/533,919, dated Jan. 4, 2008, 9 pages.

Office Action for U.S. Appl. No. 10/533,919, dated Nov. 17, 2009, 11 pages.

Office Action for U.S. Appl. No. 10/533,919, dated Aug. 6, 2008, 11 pages.

Photo Modules for PCM Remote Control Systems, Vishay, TSPO22, Document No. 82095, Rev. 4. Mar. 30, 2001, 7 pages.

Skylink Garage Door/Gate Remote Control, Model 39 User's Instructions, Steps for Programming the Transmitter, 2 pages.

Written Opinion for International Application No. PCT/US2004/015886, mailed Dec. 8, 2004, 6 pages.

Applicant's response to final Office Action for U.S. Appl. No. 10/533,919, submitted Feb. 17, 2010.

Applicant's response to final Office Action for U.S. Appl. No. 10/533,919, submitted Feb. 5, 2009.

Applicant's response to non-final Office Action for U.S. Appl. No. 10/531,108, submitted Dec. 31, 2009.

Applicant's response to non-final Office Action for U.S. Appl. No. 10/531,108, submitted Jun. 21, 2010.

Applicant's response to non-final Office Action for U.S. Appl. No. 10/533,919, submitted Jul. 7, 2009.

Applicant's response to non-final Office Action for U.S. Appl. No. 10/533,919, submitted May 5, 2008.

Letter and Claim charts from Brooks Kushman P.C. to Mr. Karl Reichenberger mailes Mar. 3, 2011, 9 pages.

Office Action for U.S Appl. No. 10/531,108, mailed May 17, 2011, 7 pages.

Office Action for U.S Appl. No. 12/898,592, mailed Jun. 13, 2011, 16 pages.

Office Action for U.S Appl. No. 10/533,919, mailed Jul. 21, 2011, 15 pages.

Request for Continued Examination for U.S. Appl. No. 10/531,108, mail date Mar. 4, 2011, 3 pages.

Request for Continued Examination for U.S. Appl. No. 10/533,919, mail date Mar. 17, 2010, 4 pages.

Decision Granting Petition to Withdraw for U.S. Appl. No. 10/531,108, mail date Mar. 7, 2011, 1 page.

* cited by examiner

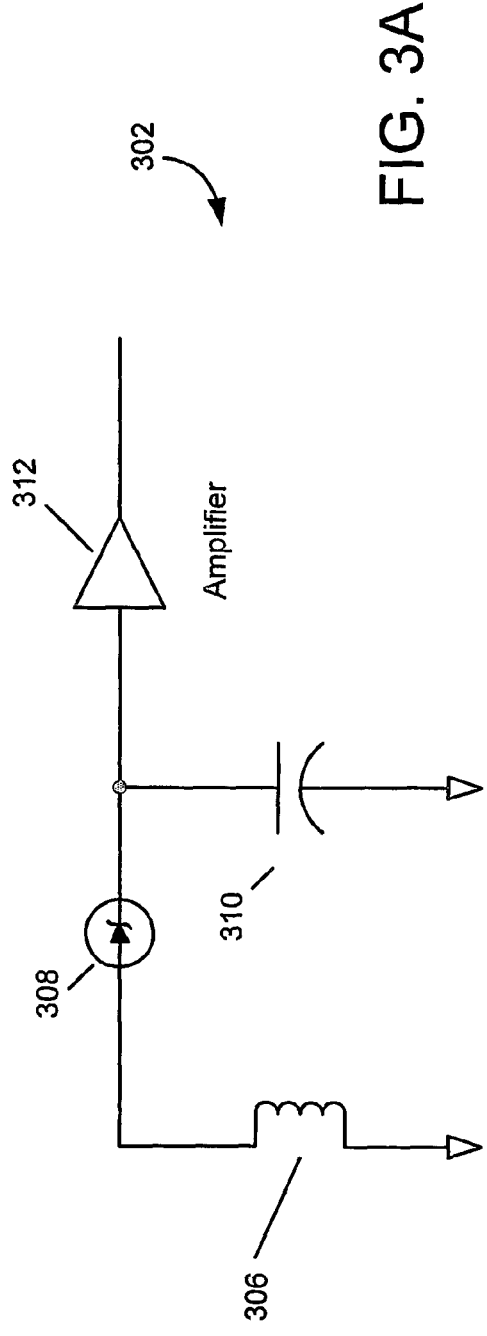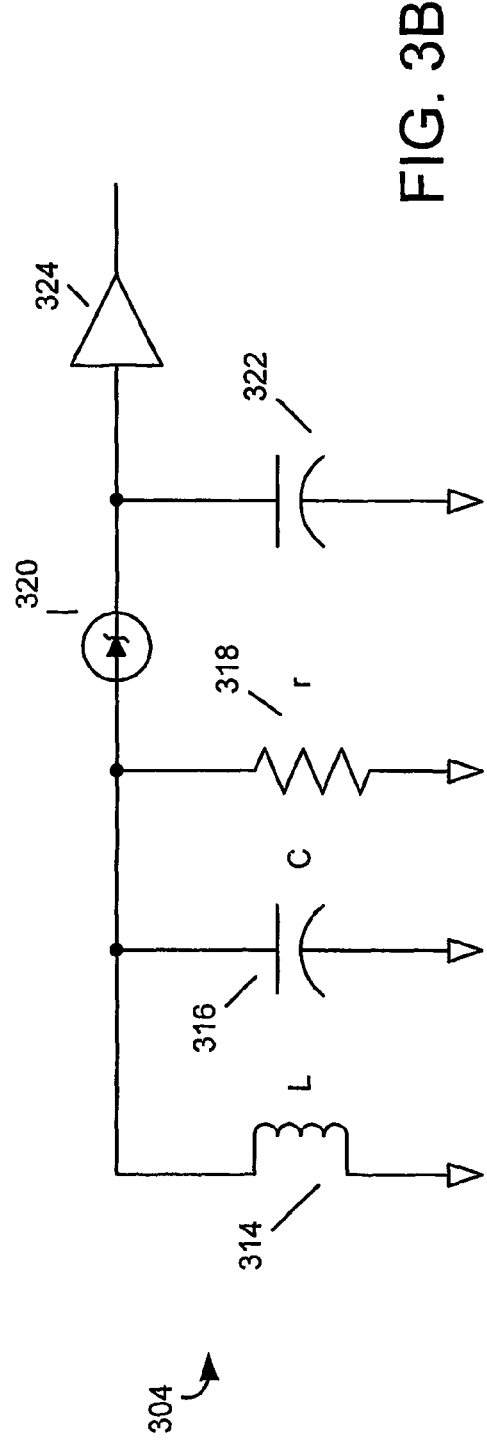

TRAINABLE REMOTE CONTROLLER AND METHOD FOR DETERMINING THE FREQUENCY OF A LEARNED CONTROL SIGNAL

CROSS-REFERENCE TO RELATED APPLICATIONS

This application claims the benefit of U.S. Provisional Application No. 60/448,993, filed Feb. 21, 2003.

FIELD OF THE INVENTION

The present invention relates to a trainable radio frequency (RF) transceiver and particularly to a trainable transceiver for a vehicle that transmits a control signal to a remotely controlled device.

BACKGROUND OF THE INVENTION

Electronically operated remote control systems, such as garage door openers, home security systems, home lighting systems, etc. are becoming increasingly common. Such electronic remote control systems typically employ a battery powered portable RF transmitter for transmitting a modulated and encoded RF signal to a receiver located at the remote control system. For example, a garage door opener system may include a receiver located within a home owner's garage. The garage door receiver is tuned to the frequency of its associated portable RF transmitter and demodulates a predetermined code programmed into both the portable transmitter and receiver for operating the garage door. Conventional portable transmitters have consisted of a portable housing which typically is clipped to a vehicle's visor or otherwise loosely stored in the vehicle.

As an alternative to a portable transmitter, a trainable transceiver (e.g., a remote control transceiver) may be provided in vehicles for use with remote control devices such as garage door openers, gate controllers, alarm controls, home lighting systems, etc. Typically, a trainable transceiver may learn and store the modulation scheme (i.e., code format), transmission codes and the particular RF carrier frequencies of one or more OEM (original equipment manufacturer) remote transmitters for use with the remote control devices. A vehicle owner may train the transceiver to the vehicle owner's existing remote RF transmitter. Subsequently, the old remote RF transmitter can be discarded or stored.

To enhance security of remote control devices, manufacturers have implemented cryptographic algorithms in their original transmitters and receivers that transmit and respond to randomly varying codes. To enable a vehicle-installed trainable transmitter to effectively operate in such systems, trainable transmitters have been developed that have the capability of recognizing when a received signal has been originated from a transmitter that generates a code that varies with each transmission in accordance with a cryptographic algorithm. When such a variable or rolling code is recognized, the trainable transmitter determines which cryptographic algorithm is used to generate and transmit the next code to which the receiver will respond.

It would be advantageous to provide a trainable transceiver, system and method configured to identify an RF frequency or frequencies of operation for a control signal having a rolling control code based on data characteristics of the control signal. It would also be advantageous to provide a trainable transceiver, system and method configured to identify an RF frequency or frequencies of operation for a control signal having a fixed control code based on data characteristics of the control signal.

SUMMARY OF THE INVENTION

In accordance with an embodiment, a trainable transceiver for learning signal characteristics of an RF control signal received from a remote control transmitter used to remotely actuate a device and for subsequently transmitting a modulated RF signal having the learned signal characteristics includes an antenna, a wideband receiver coupled to the antenna, the wideband receiver configured to receive an RF control signal from the remote control transmitter, the RF control signal including a control code, a set of data characteristics and an RF carrier frequency and a control circuit coupled to the wideband receiver, the control circuit having a training mode in which the control circuit is configured to identify and store the control code of the RF control signal, to identify at least one data characteristic from the set of data characteristics and to identify at least one RF frequency associated with the RF control signal based on the at least one data characteristic.

In accordance with another embodiment, a trainable transceiver for learning signal characteristics of an RF control signal received from a remote control transmitter used to remotely actuate a device and for subsequently transmitting a modulated RF signal having the learned signal characteristics, includes an antenna, a wideband receiver coupled to the antenna, the wideband receiver configured to receive an RF control signal from the remote control transmitter, the RF control signal including a control code, a set of data characteristics and an RF carrier frequency and a control circuit coupled to the wideband receiver and having a training mode in which the control circuit is configured to identify and store the control code of the RF control signal and having an operating mode in which the control circuit is configured to identify at least one data characteristic from the set of data characteristics and to identify at least one RF frequency associated with the RF control signal based on the at least one data characteristic.

In accordance with another embodiment, a method for training a transceiver to learn a set of signal characteristics of an RF control signal received from a remote control transmitter, the transceiver having an antenna and a wideband receiver includes initiating a training sequence, identifying and storing a control code of the RF control signal, identifying at least one data characteristic from a set of data characteristics for the RF control signal and identifying at least one RF frequency based on the at least one data characteristic.

In accordance with a further embodiment, a trainable transceiver for learning signal characteristics of an RF control signal received from a remote control transmitter used to remotely actuate a device and for subsequently transmitting an RF signal having the learned signal characteristics includes an antenna, a controllable tuned RF detector coupled to the antenna and configured to receive at least one RF control signal having a frequency in a predetermined range of frequencies, a controllable frequency generator coupled to the controllable tuned RF detector and configured to generate signals at a plurality of frequencies, and a control circuit coupled to the controllable tuned RF detector and the controllable frequency generator and configured to identify a control code of an RF control signal received by the controllable tuned RF detector and to provide a test signal to the controllable frequency generator to initiate a testing sequence to determine an RF frequency of the controllable tuned RF detector upon receipt of the RF control signal.

BRIEF DESCRIPTION OF THE DRAWINGS

The invention will be more readily understood by reference to the following description taken with the accompanying drawings, in which:

FIG. 3A is a schematic circuit diagram of an exemplary untuned wideband receiver or detector in accordance with an embodiment.

FIG. 3B is a schematic circuit diagram of an exemplary tuned wideband receiver or detector in accordance with an embodiment.

DETAILED DESCRIPTION OF THE PREFERRED AND OTHER EXEMPLARY EMBODIMENTS

Figure 1:
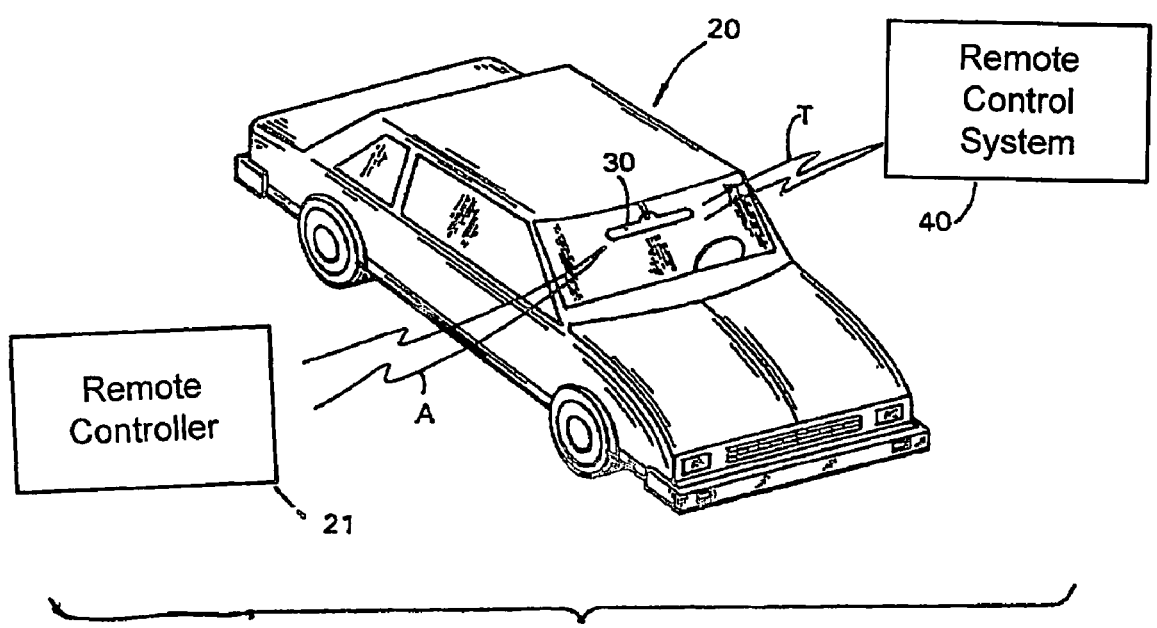
FIG. 1 shows a remote control system and a vehicle including a trainable transceiver in accordance with an embodiment.

FIG. 1 shows a remote control system and a vehicle including a trainable transceiver in accordance with an embodiment of the invention. Vehicle 20 is an automobile, although it should be understood that the trainable transceiver of the present invention may be embodied in other vehicles or other systems such as a portable housing. The system as illustrated in FIG. 1 includes a portable remote transmitter 21 in the form of a remote controller for a remote control system 40 such as a garage door opener, home security system, home lighting systems, electronically operated access gates, or any other household appliance or system capable of receiving an RF control signal, etc. The coded radio frequency (RF) (or infrared) energy of the transmitter 21 is transmitted as indicated by arrow A to a transceiver 50 (FIG. 2) of a control module which may be mounted within the vehicle 20 inside, for example, a rearview mirror 30 or other suitable location. The transceiver 50 receives the encoded transmitted energy, demodulates it, and a programmable control circuit coupled to the receiver responds to signals therefrom to provide a variety of selected control functions. For example, the programmable control circuit may be configured to learn the control code of the signal and store the information for later transmission. The transceiver 50 included in the control module selectively transmits coded RF energy as indicated by arrow T to a remote electrical system 40, such as, for example, a garage door opening mechanism, that is responsive to the control signal. The programmable control circuit controls transceiver 50 (FIG. 2) to generate a carrier signal and modulate the control code onto a carrier signal to generate the control signal. The operation of the programmable control circuit and the transceiver 50 are described in detail below.

Figure 2:
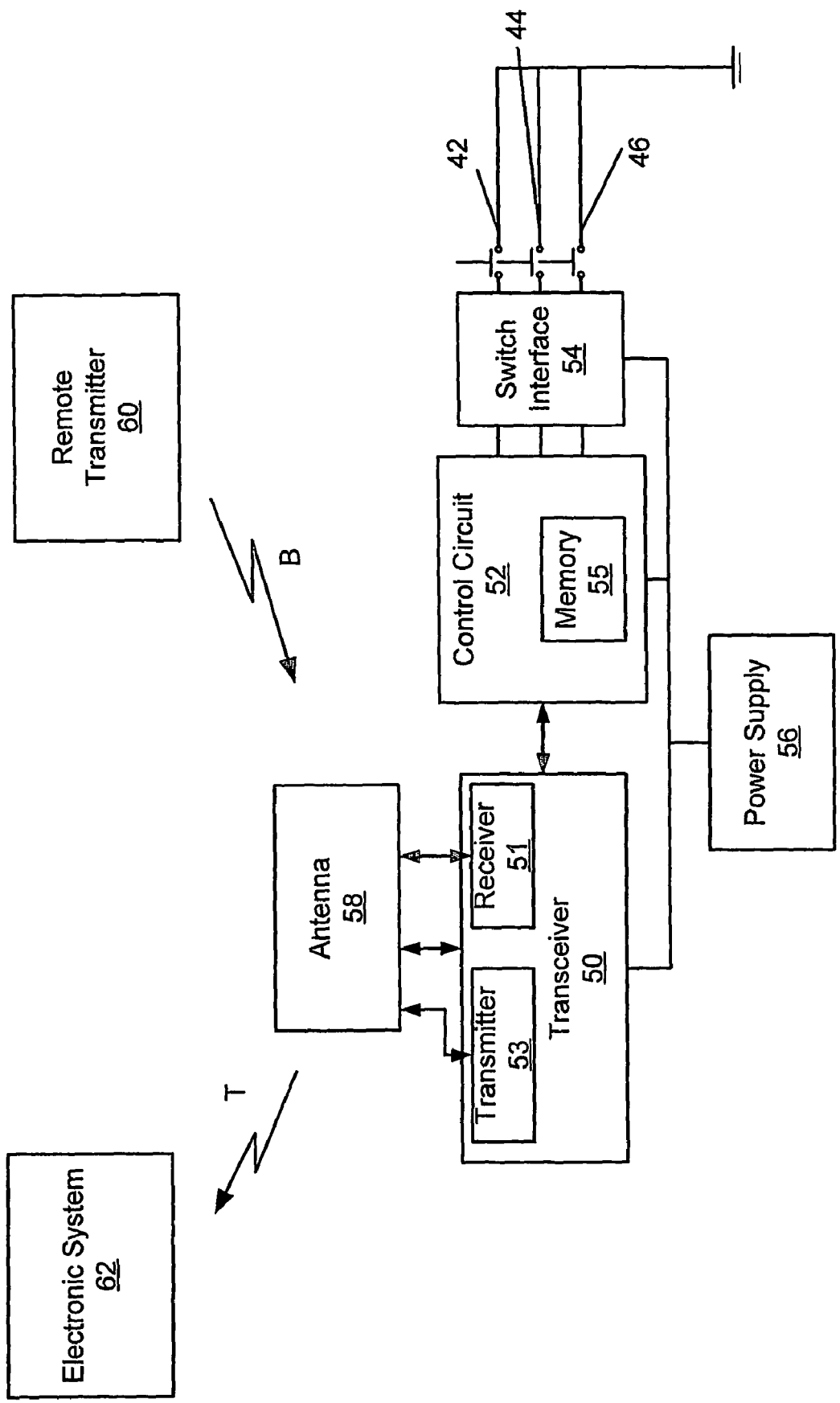
FIG. 2 is a schematic block diagram of a trainable transceiver in accordance with an embodiment.

FIG. 2 is a schematic block diagram of a trainable transceiver in accordance with an embodiment. The system shown in FIG. 2 includes a transceiver circuit 50 that is coupled to an antenna 58 and a control circuit 52. A switch interface 54 is connected to one terminal of each of three push button switches 42, 44, and 46, which have their remaining terminal connected to ground. Switches 42, 44, and 46 may each be associated with a separate remote control system to be controlled by transceiver 50. Interface circuit 54 couples signal information from switches 42, 44, and 46 to the input terminals of control circuit 52. A power supply 56 is conventionally coupled to the vehicle's battery and is coupled to the various components for supplying their necessary operating power in a conventional manner.

As mentioned, switches 42, 44, and 46 may each correspond to a different device to be controlled such as different garage doors, electronically operated access gates, house lighting controls or other remote control systems, each of which may have their own unique operating RF frequency, modulation scheme, and/or control code. Thus, switches 42, 44, and 46 correspond to a different radio frequency channel for trainable transceiver 50. Once the RF channel associated with one of the switches 42, 44, and 46 has been trained (as described in more detail below) to an RF control signal B transmitted from a portable, remote transmitter 60 associated with a remote control system 62 (e.g., a garage door opener), transceiver 50 may then transmit an RF signal T having the same characteristics as the control signal B to actuate the remote control system 62 when, for example, the corresponding switch is momentarily depressed. Thus, by identifying and storing signal characteristics such as the carrier frequency, modulation scheme, and control or data code of a received RF control signal B originating from the remote transmitter 60, transceiver 50 may subsequently transmit an RF signal T having the identified signal characteristics of the RF signal that are necessary to activate the remote control system 62. Each RF channel may be trained to a different RF control signal such that a plurality of devices or systems may be activated by depressing a corresponding one of the switches 42, 44, 46. Such other devices or systems may include, for example, additional garage door openers, a building's interior or exterior lights, a home security system, or any other household appliance or system capable of receiving an RF control signal.

Control circuit 52 includes data input terminals for receiving signals from the switch interface 54 indicative of the closure states of switches 42, 44, and 46. Control circuit 52 may include various types of control circuitry, digital and/or analog, and may include a microprocessor, microcontroller, application-specific integrated circuit (ASIC), or other circuitry configured to perform various input/output, control, analysis, and other functions to be described herein. Control circuit is configured to learn the control code of a control signal using known methods or algorithms.

As mentioned, control circuit 52 is also coupled to the transceiver 50. Transceiver 50 as shown in FIG. 2 includes a receiver 51 (or receiver circuitry) that is capable of receiving signals over a plurality of frequencies and a transmitter 53 (or transmitter circuitry) that is configured to transmit a signal on one or more frequencies. In one embodiment, receiver 51 is a broadband or wide-band receiver that is capable of receiving signals over a wide range of frequencies, e.g., the RF range (280-440 MHz). Wideband receiver 51 may be used to acquire the control or data code of a control signal while the frequency of transmission of the control signal is left undetermined. FIG. 3A shows a circuit diagram of an exemplary untuned wideband receiver or detector 302. An inductor 306 functions as an antenna and is configured to receive an RF signal and convert it to a voltage. The voltage is then rectified (or detected) by a diode 308, for example, a schottky diode or a zero bias diode. A capacitor 310 stores the detected voltage and serves as a low pass filter that filters out the RF carrier frequency and leaves the baseband data or modulation. The voltage at capacitor 310 may be a few millivolts up to several hundred millivolts. An amplifier 312 may be used to increase the signal for use by a control circuit or processor. Circuit 302 is responsive to all RF signals. For weaker signals, the transmitter, e.g., a garage door transmitter, may be held close to the wideband receiver in order to be detected.

In an alternative embodiment, receiver 51 may be a tuned wideband receiver capable of receiving signals over a predetermined bandwidth, for example, at least 2 MHz. In one embodiment, the RF detector may have a 10 MHz range. The actual frequency values defining the range of the tuned wideband receiver or detector may be varied over the entire RF frequency range until a signal is detected. FIG. 3B shows a circuit diagram of an exemplary tuned wideband receiver or detector 304. An inductor 314 functions as an antenna. A capacitor 316 together with inductor 314 determines a resonant frequency of the receiver. At resonance receiver 304 will be the most sensitive. The resonant frequency may be fixed, tuned or variable. A fixed capacitor 316 provides a fixed resonant frequency. If capacitor 316 is a tunable type, for example, a varactor diode, receiver 304 may be used to sweep across the frequency band or wait at a particular frequency. A resistor 318 may be an actual component or element or may be a result of the practical resistance (or loss) in the inductor 314 and capacitor 316. Resistor 318 (or loss) may be controlled to select a bandwidth of the circuit. A capacitor 322, after a diode 320, serves as a low pass filter that filters out the RF carrier and leaves the baseband data or modulation. An amplifier 324 may be used to increase the signal for use by a control circuit or processor. As mentioned previously, wideband receiver 51 may acquire data, such as the control code, of the control signal but the frequency of the control signal is left undetermined. In other words, the exact RF carrier frequency of the remote transmitter does not need to be known or learned at the same time as the control code (i.e., when the RF control signal is received by the receiver). Transceiver 50 is also capable of transmitting learned RF control signals via antenna 58 and transmitter 53.

In order to train transceiver 50, remote transmitter 60 is used to send an RF control signal (or message) B used to control the electronic system 62 to transceiver 50. Receiver 51 of transceiver 50 receives the RF control signal B via antenna 58. Control signal B includes a control code (or data code) and has a set of data characteristics. Control circuit 52 uses the control signal to learn the control code. Accordingly, control circuit 52 is configured to learn the control code using known methods or algorithms. Control circuit 52 is also configured to use the data characteristics of the control signal to determine a transmission frequency (or RF carrier frequency) or frequencies as described further below.

In one embodiment, the electronic system 62 uses a fixed control code in the control signal (i.e., a control code that does not vary with each transmission of the control signal). The same control code from the original control signal B of the remote transmitter 60 is used in a control signal T transmitted by the transceiver 50 to the electronic system 62. In addition, the same control code is used in each transmission of a control signal by transceiver 50. As mentioned above, upon receipt of a control signal, control circuit 52 identifies and stores the control code from the control signal B using known methods or algorithms. Control circuit 52 also identifies at least one data characteristic from the set of data characteristics of the control signal. The set of data characteristics for a control signal may include, for example, the number of bits in the control signal or message, the high and low timing of individual bits in the data, the ratio of high and low timing of individual bits, the presence of a specific preamble, the absence of a preamble, the packet to packet time, the duration of time between packets (idle time), the time of the packet, whether the data is continuous, the ratio of the time of a single bit or bits of the preamble compared to the time of the other bits, patterns of bits including the repetition of bits, certain bits in the sequence being a 0 or a 1, the type of modulation method used (e.g., PPM (Pulse Position Modulation), PWM (Pulse Width Modulation), or Manchester), the minimum time the signal is high, the ratio of the packet to packet time and the minimum time the signal is high, etc.

An identified data characteristic or characteristics may be used to determine the type of remote system (e.g., the particular manufacturer of the remote system corresponding to the remote transmitter 60 and electronic system 62). The system type information (e.g., a particular manufacturer or a remote system of a particular manufacturer) is used by control circuit 52 to determine or identify a transmission frequency (or RF carrier frequency) or frequencies that may be used by transceiver 50 to transmit the control code for the electronic system 62. For example, certain data characteristics may be associated with a particular remote system or remote system manufacturer. A single manufacturer may produce different types of remote systems with different data characteristics and/or operating on different frequencies. A particular remote system or remote system manufacturer is associated with at least one operating frequency. Accordingly, data characteristics of a control signal may be used to identify a manufacturer (or further a set of systems made by a manufacturer) and, therefore, an original transmission frequency or frequencies for the control signal.

In one embodiment, control circuit 52 includes a memory 55 that is configured to store information regarding the data characteristics of control signals for various remote control system manufacturers (and/or various remote control systems) as well as the appropriate transmission frequency or frequencies for those systems. For example, data characteristics such as a 12 bit packet and a 1 or 3 unit high time may be associated with (and used by) a Manufacturer A that is known to utilize a 300 MHz operating frequency. In one embodiment, the data characteristics and associated system manufacturers and frequencies may be stored in a look up table in memory 55. In another embodiment, if the remote system or remote system manufacturer is associated with more than one operating frequency, one or more data characteristics from the set of data characteristics of the control signal may be used to further reduce the number of possible frequencies.

In an alternative embodiment, electronic system 62 uses a rolling control code (i.e., the control code is encrypted using a rolling code encryption method). With a rolling control code, a cryptographic algorithm is used to generate a new control code for each transmission of the control signal. Upon receipt of a control signal, control circuit 52 identifies and stores the control code from the control signal B using known methods or algorithms. Control circuit 52 also identifies at least one data characteristic from a set of data characteristics of the control signal. The set of data characteristics of a control signal may include, for example, the number of bits in the message, the high and low timing of individual bits in the data, the ratio of the high and low timing of individual bits of data, the presence of a specific preamble, the duration of time between packets, the ratio of time of a single bit or bit of the preamble compared to the time of the other bits, the time of the packet, particular patterns of bits including repetition of bits, certain bits in the sequence being a 0 or a 1, etc.

An identified data characteristic or characteristics may be used to determine the type of system (e.g., the particular manufacturer of the remote system corresponding to the remote transmitter 60 and electronic system 62) and an encryption method or algorithm corresponding to, for example, the manufacturer of the remote transmitter 60 and the electronic system 62. The system type information (e.g., a particular manufacturer or a remote system of a particular manufacturer) is used by control circuit 52 to determine or identify the appropriate transmission frequency or frequencies for the control signal as well as the appropriate cryptographic algorithm (and the data required for input to the cryptographic algorithm) to produce the rolling control code. For example, certain data characteristics may be associated with a particular remote system or remote system manufacturer. A single manufacturer may produce different types of remote systems with different data characteristics and/or operating on different frequencies. A particular remote system or remote system manufacturer is associated with at least one operating frequency and may further be associated with a particular cryptographic algorithm to produce a rolling or variable control code. Accordingly, data characteristics of a control signal may be used to identify a manufacturer (or further a set of systems made by a manufacturer) and therefore, an original transmission frequency or frequencies for the control signal and an encryption method for the rolling control code.

In one embodiment, control circuit 52 includes a memory 55 that is configured to store information regarding the data characteristics of control signals for various rolling code remote control system manufacturers (and/or various rolling code remote control systems) as well as the appropriate transmission frequency or frequencies and rolling code or encryption algorithms for those systems. When a data characteristic of the control signal is identified, control circuit 52 may access the stored information (e.g., a look up table) to identify a manufacturer and the associated frequencies and encryption algorithm for the manufacturer. In another embodiment, if the remote system or remote system manufacturer is associated with more than one operating frequency, one or more data characteristics from the set of data characteristics for the control signal may be used to further reduce the number of possible frequencies.

Once an RF frequency or frequencies have been identified, the frequency information may be stored by control circuit 52 in, for example, memory 55. Transceiver 50 may then use the learned control code and frequency information to transmit an RF signal T via antenna 58 and transmitter 53 to actuate the remote control system 62. As mentioned above, transmitter 53 is preferably configured to transmit a signal at one or more frequencies. Alternatively, the learned control (or data) code may be stored and an RF frequency or frequencies may be determined or identified each time the control code is transmitted using the control signal data characteristics as described above.

As mentioned previously, more than one frequency may be identified as a possible transmission frequency for a control signal for the electronic system 62 based on the control signal data characteristics. Accordingly, transceiver 50 and control circuit 52 may be configured to generate and transmit a control signal at each identified frequency to determine the correct frequency for transmission. In one embodiment, the possible frequencies are transmitted sequentially to determine the correct frequency. In another embodiment, one or more data characteristics of the control signal may be used to rank the order in which the identified frequencies are tried by transceiver 50. In another embodiment, the identified frequencies may be interspersed with less commonly used frequencies. For each of the above methods, as each frequency is tested, a user may observe the electronic system 62 to determine if the control signal has been successfully transmitted and received. The user may then indicate successful receipt of the control signal by, for example, pressing the switch 42, 44, 46 corresponding to the channel being trained, a combination of key presses, selecting a menu item on a display, etc. The frequency corresponding to the activation of the electronic system (as indicated by the user feedback) may then be associated with the control signal (an control code) and stored in, for example, memory 55. Alternatively, all of the identified possible frequencies may be used each time the control code is transmitted by transceiver 50 (i.e., the actual frequency is not identified and stored).

Figure 4:
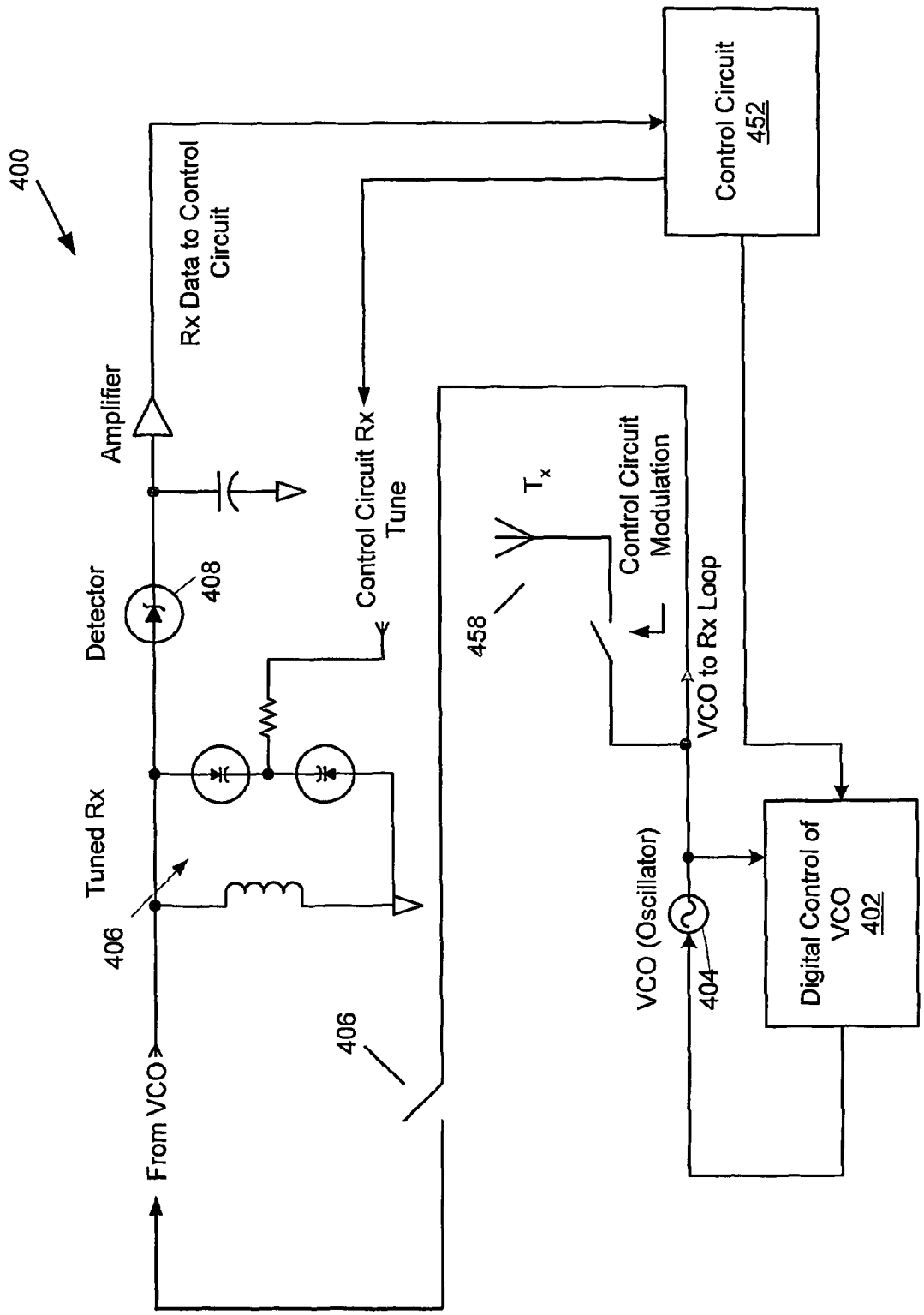
FIG. 4 is a schematic circuit diagram of an exemplary controllable tuned RF detector system in accordance with an embodiment.

In yet another embodiment, the correct operating frequency for the transmitter may be determined using a controllable tuned RF detector 400 as shown in FIG. 4. RF detector 400 may be used in place of receiver 51 (FIG. 2) or in addition to receiver 51 in transceiver 50. RF detector 400 may be used to determine the correct frequency for a learned control signal when the more than one frequency is identified based on the control signal data characteristics. Alternatively, RF detector 400 my be used by itself to determine the correct frequency for a learned control signal. RF detector may be, for example, a tuned LC resonant detector as described above with respect to FIG. 3B. RF detector circuit 400 includes a tuned RF pickup loop 406 and a detector (or diode) 408. RF pickup loop is configured to detect and receive signals. RF detector 400 is coupled to a control circuit 452 and a controlled oscillator (VCO) 404. Oscillator 404 is also coupled to control circuit 452 and an antenna 458. Control circuit 452 is configured to control and operate RF detector 400 and oscillator 404. Control circuit 452 is also configured to learn the control code of a received control signal using known methods or algorithms. In operation, the transceiver 50 (shown in FIG. 2) is placed in a training mode and a user activates an original remote control transmitter to send a control signal. Control circuit 452 sends a control circuit Rx tune signal to RF pickup loop 406 to scan the frequency of the RF detector 400. RF detector 400 is swept across a wide frequency range by varying a control voltage (control circuit Rx tune). When a signal is detected, the sweeping stops and the control voltage may be varied to maximize the signal. Control circuit 452 then learns and stores the control code and other data of the control signal.

Oscillator 404 is also coupled to the RF detector (or tuned receiver) 400. A frequency of oscillator 404 may be controlled using control circuit 452. The oscillator may be used in combination with control circuit 452 and RF detector 400 to determine the resonant frequency of RF detector 400. Oscillator 404 may be used to test the frequency RF pickup loop 406 is tuned to. RF detector 400 is held at its previous control voltage and a signal from the oscillator 404 is applied to an antenna by closing a switch 410 between the oscillator 404 and RF detector 400. The frequency of oscillator 404 is then varied until the maximum signal in the RF detector 400 is produced. The frequency of the oscillator when the maximum RF detector 400 signal is produced corresponds to the tuned receiver resonant frequency. The identified frequency of RF detector 400 may be stored with the control code of the control signal by control circuit 452. To retransmit the control signal, oscillator 404 is set to the frequency stored in memory for a particular control signal and the associated control code is used to modulate the transmission signal.

Returning to FIG. 1, transceiver 50 and control circuit 52 may also use methods to determine the frequency of transmission of the control signal that do not utilize the data characteristics of the control signal. Control circuit 52 may use alternative methods if, for example, the correct frequency is not determined using the data characteristics of the control signal. As discussed above, receiver 51 may be either a wideband receiver or a tuned wideband RF detector that receives signals for a plurality of frequencies. When a control signal is received, control circuit 52 learns the control code for the control signal. The correct transmission frequency of the control signal may then be determined by sequentially testing a set of possible frequencies. In one embodiment, the sequential frequencies are tried using predetermined increments, such as the expected receiver bandwidth. In another embodiment, a set of commonly used frequencies may be tried where the order of the frequencies is determined by ranking the frequencies based on the likelihood of compatibility with the electronic system 62. As each frequency is sequentially tested, the user may observe the electronic system 62 to determine if the control signal has been successfully transmitted and received. The user can indicate successful receipt of the control signal by, for example, pressing the switch 42, 44, 46 corresponding to the channel being trained, a combination of key presses, selecting a menu item on a display, etc.

Figure 5:
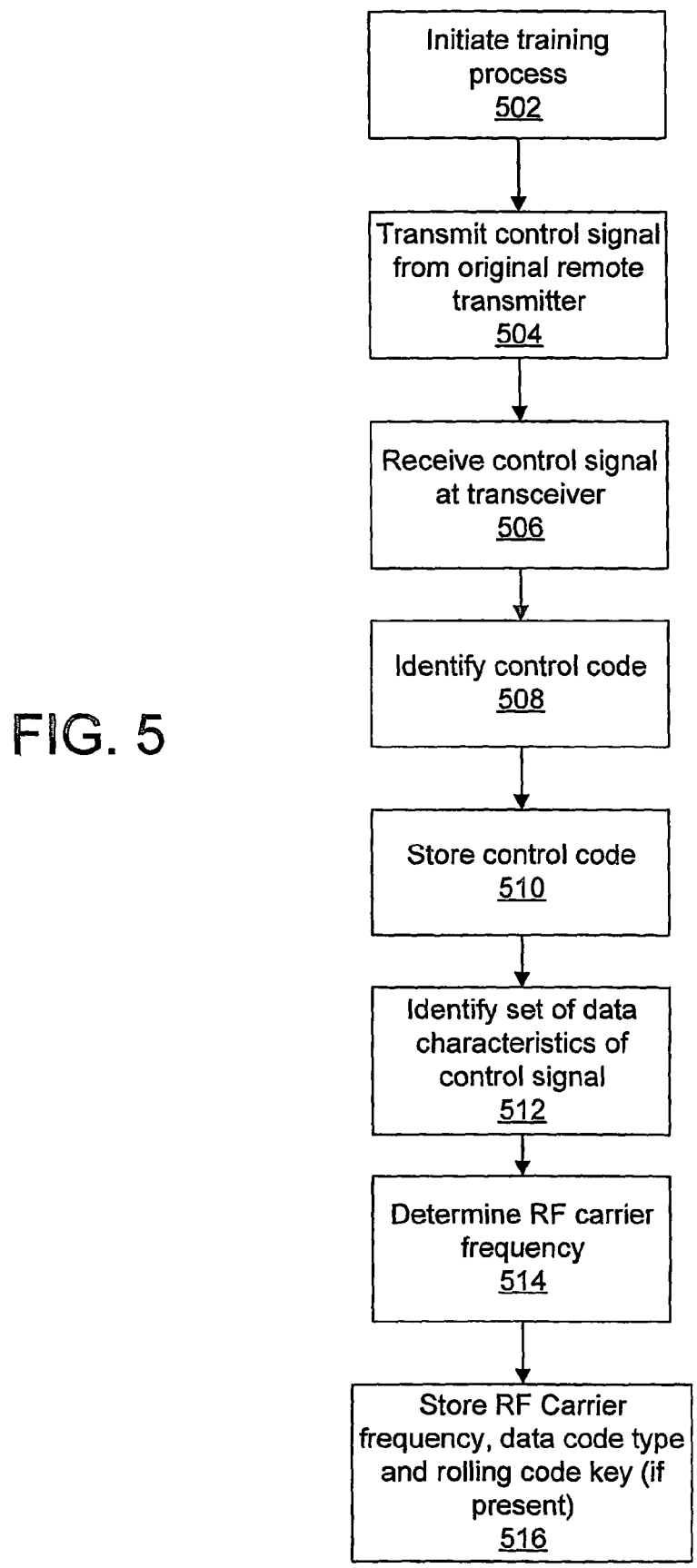
FIG. 5 illustrates a method for a learning process for a trainable transceiver in accordance with an embodiment.

FIG. 5 illustrates a method for a learning process for a trainable transceiver in accordance with an embodiment. At block 502, the training process is initiated. The training process may be initiated by, for example, actuating one of the push buttons 42, 44, and 46 (FIG. 2), a combination of key presses, selecting a menu item on a display or may be initiated when a signal is received by the transceiver. Alternatively, if the trainable transceiver is mounted in a vehicle, the training sequence may be initiated by a message on a vehicle bus. At block 504, a remote transmitter 60 (to which the transceiver 50 is to be trained) is activated to send an RF control signal. The RF control signal may include, for example, a fixed control code or a rolling control code and has a set of data characteristics. Receiver 51 receives the RF control signal transmitted by the remote transmitter 60 via antenna 59 at block 506. Receiver 51 may be a broadband/wide-range receiver that is capable of receiving signals over a wide range of frequencies or a tuned wideband RF receiver or detector that is capable of receiving signals over a predetermined range, for example, at least 2 MHz. Accordingly, the exact RF carrier frequency of the remote transmitter control signal does not need to be known or learned at the same time as the control code (i.e., when the RF control signal is received by the receiver).

At block 508, a control circuit is used to determine whether the control signal has a fixed or variable (i.e., rolling) control code. A control code is identified using known methods or algorithms (block 508) and stored in, for example, a memory device (block 510). In addition, at block 512, the control circuit 52 identifies at least one data characteristic of the control signal sent by the remote transmitter. As mentioned previously, the set of data characteristics of a control signal may include, for example, the number of bits in the control signal or message, the high and low timing of individual bits in the data, the ratio of high and low timing of individual bits, the presence of a specific preamble, the absence of a preamble, the packet to packet time, the duration of time between packets (idle time), the time of the packet, whether the data is continuous, the ratio of the time of a single bit or bits of the preamble compared to the time of the other bits; patterns of bits including the repetition of bits, certain bits in the sequence being a 0 or a 1, the type of modulation method used (e.g., PPM (Pulse Position Modulation), PWM (Pulse Width Modulation), or Manchester), the minimum time the signal is high, the ratio of the packet to packet time and the minimum time the signal is high, etc.

An identified data characteristic or characteristics may used to determine an RF frequency (i.e., the transmission frequency) for transmission of the control code (block 514). For example, control signal data characteristics may be used to identify the type of system (e.g., the particular manufacturer of the remote transmitter 60 and electronic system 62). The type of system information may then be used to determine or identify the appropriate transmission frequency for the control signal. For example, certain data characteristics may be associated with a particular remote system or remote system manufacturer. A particular remote system or remote system manufacturer is associated with at least one operating frequency. Accordingly, the data characteristic or characteristics may be used to identify a manufacturer (or further a set of systems made by a manufacturer) and; therefore, a set of possible original transmission frequencies for the control signal. The transmission frequency may be stored by the control circuit at block 516. If the control code is a rolling code, the set of characteristics of the control signal may further be used to determine the appropriate cryptographic algorithm for the rolling code. In one embodiment, information regarding the data characteristics of control signals for various fixed code and rolling code remote control systems and manufacturers as well as the appropriate transmission frequencies and cryptographic algorithms (if appropriate) for those systems and manufacturers is stored in a memory of the transceiver, for example, as a look up table.

Figure 6:
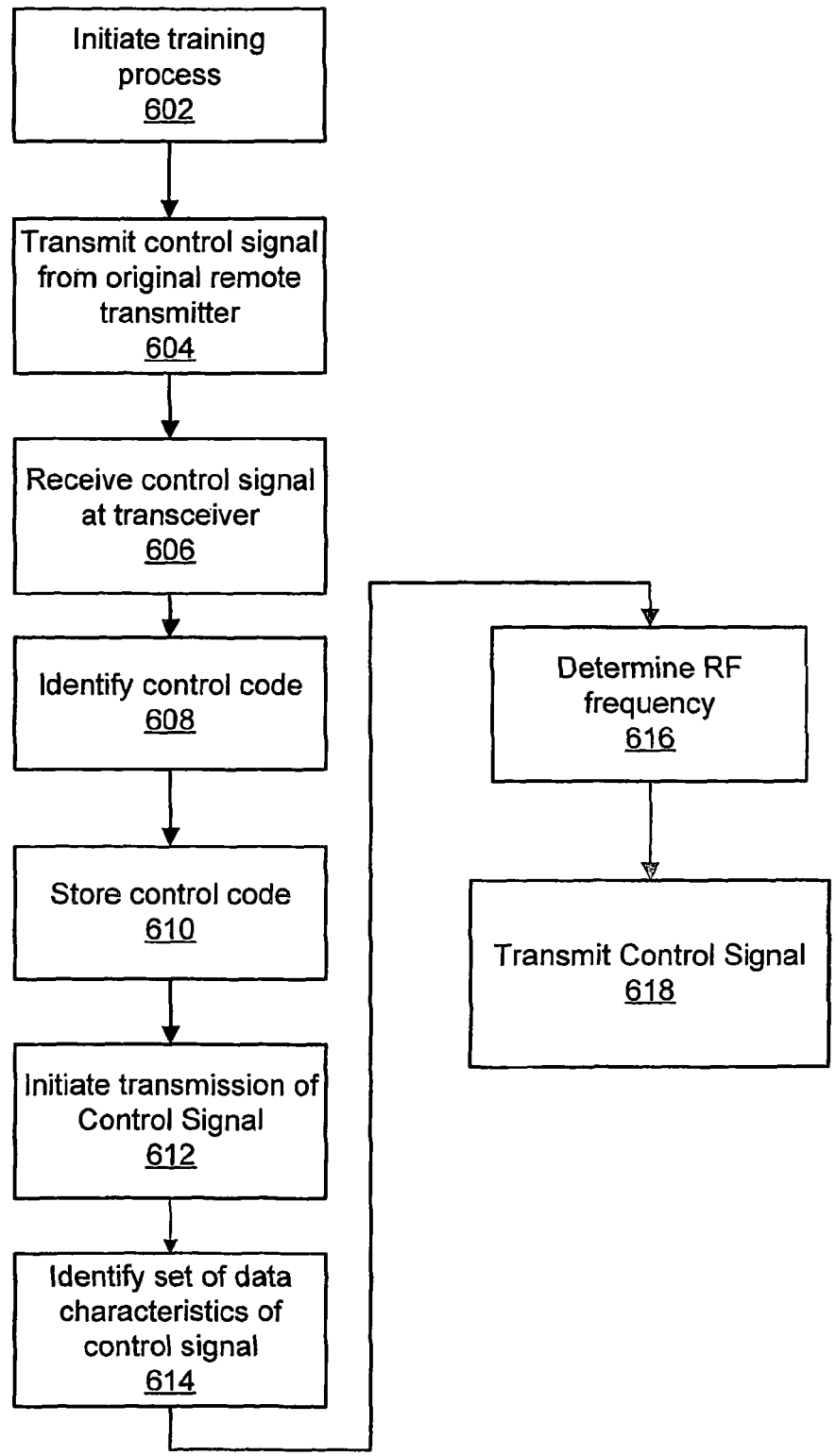
FIG. 6 illustrates a method for identifying an RF frequency or frequencies for a control signal learned by a trainable transceiver in accordance with an alternative embodiment.

In an alternative embodiment, the RF frequency for the control signal may be determined or identified when the control code is transmitted by the transceiver 50 and then stored or, alternatively, may be identified each time the control code is transmitted by the transceiver 50. FIG. 6 illustrates a method for identifying an RF frequency or frequencies for a control signal learned by a trainable transceiver in accordance with an alternative embodiment. Steps 602-610 in FIG. 6 are similar to steps 502 to 510 described above with respect to FIG. 5 for learning the control code of a control signal. In the embodiment of FIG. 6, an RF frequency or frequencies are identified when the transceiver is activated to transmit a control signal to the remotely controlled system. At block 612 of FIG. 6, transmission of a control signal having the learned control code is initiated by, for example, actuating a switch of the transceiver associated with the learned control code, a combination of key presses, selecting a menu item on a display, etc. At block 614, at least one data characteristic of the original control signal sent by the remote transmitter is identified and then used to determine an RF frequency or frequencies for transmission of the control code at block 616. As discussed previously, an identified data characteristic or characteristics may be used to identify a manufacturer (or further a set of systems made by a manufacturer) and, therefore, a set of possible original transmission frequencies for the control signal. In addition, for a rolling control code, the identified data characteristic or characteristics may be used to identify a manufacturer and, therefore, an encryption algorithm for generating the rolling control code. Once an RF frequency or frequencies are identified, a control signal having the control code and RF frequency or frequencies is transmitted to the remote system at block 618. As mentioned, in this embodiment, the RF frequency or frequencies for transmission are identified when the learned control code is subsequently transmitted by the transceiver. In one embodiment, the identified RF frequency or frequencies may be stored. As discussed above with respect to FIG. 2, if more than one RF frequency is identified using the data characteristics of the control signal, various methods may be used to identify the correct frequency of operation. Alternatively, the RF frequency or frequencies may determined each time the control signal is transmitted using the transceiver.

It is also important to note that the construction and arrangement of the elements of the trainable transceiver as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited herein. Accordingly, all such modifications are intended to be included within the scope of the present invention as described herein. The order or sequence of any process or method steps may be varied or re-sequenced according to alternative embodiments. Other substitutions, modifications, changes and/or omissions may be made in the design, operating conditions and arrangement of the preferred and other exemplary embodiments without departing from the exemplary embodiments of the present invention as expressed herein.

What is claimed is:

1. A trainable transceiver for learning signal characteristics of an RF control signal received from a remote control transmitter used to remotely actuate a device and for subsequently transmitting a modulated RF signal having the learned signal characteristics, the trainable transceiver comprising:
    an antenna;
    a wideband receiver coupled to the antenna, the wideband receiver configured to receive an RF control signal from the remote control transmitter; and
    a control circuit coupled to the wideband receiver, the control circuit having a training mode in which the control circuit is configured to determine a device type associated with the RF control signal without first determining the frequency of transmission of the received RF control signal;
    wherein the control circuit is further configured to determine and store a plurality of possible frequencies, for future transmissions of the modulated RF signal from the trainable transceiver, based on the determined device type; and
    wherein the control circuit is configured to cause the transceiver to transmit new modulated RF signals based on the determined device type and the determined plurality of possible frequencies, and wherein the control circuit is configured to cause the transmissions to be sequential and to be sequenced such that commonly used frequencies of the plurality of possible frequencies are interspersed with less commonly used frequencies, wherein the control circuit is configured to use the sequential transmissions in a feedback-based process for determining whether a transmission has been successfully received by the device for remote actuation.

2. A trainable transceiver according to claim 1, wherein the feedback-based process comprises waiting for a user to indicate that the device for remote actuation has recently been actuated in response to one of the transmitted new RF signals.

3. A trainable transceiver according to claim 1, wherein the control circuit is further configured to identify and store a control code of the RF control signal without first determining the frequency of transmission of the received RF control signal, and wherein the control code is a fixed control code.

4. A trainable transceiver according to claim 1, wherein the control circuit is further configured to identify and store a control code of the RF control signal without first determining the frequency of transmission of the received RF control signal, and wherein the control code is an encrypted rolling code and the control circuit is further configured to identify an encryption algorithm associated with the RF control signal without first determining the frequency of transmission of the received RF control signal.

5. A trainable transceiver according to claim 1, wherein the control circuit has an operating mode in which the control circuit is further configured to retrieve the frequency and to generate the subsequent transmissions of the modulated RF signal.

6. A trainable transceiver according to claim 5, further including a transmitter coupled to the control circuit and the antenna, the transmitter configured to transmit the modulated RF signal to a remote actuate device.

7. A trainable transceiver according to claim 1, wherein the wideband receiver is a tuned wideband receiver.

8. A trainable transceiver according to claim 1, wherein the wideband received is an untuned wideband receiver.

9. A trainable transceiver according to claim 1, wherein the control circuit is configured to filter out the RF carrier frequency prior to determining the device type.

10. A trainable transceiver for learning signal characteristics of an RF control signal received from a remote control transmitter used to remotely actuate a device and for subsequently transmitting a modulated RF signal having the learned signal characteristics, the trainable transceiver comprising:
    an antenna;
    a wideband receiver coupled to the antenna, the wideband receiver configured to receive an RF control signal from the remote control transmitter without scanning for the RF control signal; and
    a control circuit coupled to the wideband receiver and having a training mode configured to filter out the carrier frequency of the RF control signal and to analyze the modulation of the RF control signal to determine a device type associated with the remote control transmitter, and wherein the control circuit is configured to use the device type determination to determine a plurality of possible RF frequencies for use in subsequent transmissions by the trainable transceiver in a feedback-based process for identifying the frequency, wherein the determination of the RF frequency occurs without scanning of the receiver, and wherein the control circuit is configured to cause the transceiver to transmit new RF control signals based on the determined device type and the determined plurality of possible RF frequencies, and wherein the control circuit is configured to cause the transmissions to be sequential and to be sequenced such that the commonly used frequencies of the plurality of possible RF frequencies are interspersed with less commonly used frequencies, wherein the control circuit is configured to use the sequential transmissions in a feedback-based process for determining whether a transmission has been successfully received by the device for remote actuation.

11. A trainable transceiver according to claim 10, wherein the control circuit is further configured to identify and store a control code of the RF control signal, and wherein the control code is a fixed control code.

12. A trainable transceiver according to claim 10, wherein the control code is an encrypted rolling code and the control circuit is further configured to identify an encryption algorithm based on the determined device type.

13. A trainable transceiver according to claim 10, wherein the control circuit is further configured in the operating mode to retrieve a control code determined to be associated with the RF control signal and to generate an RF signal including the control code at the determined RF frequency.

14. A trainable transceiver according to claim 13, further including a transmitter coupled to the control circuit and the antenna, the transmitter configured to transmit the RF signal to a remotely actuate device.

15. A trainable transceiver according to claim 10, wherein the wideband receiver is a tuned wideband receiver.

16. A trainable transceiver according to claim 10, wherein the wideband receiver is an untuned wideband receiver.

17. A trainable transceiver according to claim 10, wherein the control circuit is further configured to generate an RF signal at each of a plurality of RF frequencies associated with the determined device type.

18. A method for training a transceiver to learn a set of signal characteristics of an RF control signal received from a remote control transmitter used to remotely actuate a device, the transceiver having an antenna and a wideband receiver, the method comprising:
   initiating a training sequence;
   receiving the RF control signal using the wideband receiver;
   determining a device type associated with the RF control signal without analyzing or determining the frequency of transmission of the received RF control signal; and
   determining a plurality of possible RF frequencies associated with the RF control signal based on the determined device type;
   conducting a feedback-based process for determining a frequency for remotely actuating the device by transmitting new RF control signals to the device and waiting for user feedback indicating a successful actuation, wherein the new RF control signal transmissions are sequential and are sequenced such that the commonly used frequencies of the determined plurality of possible RF frequencies are interspersed with less commonly used frequencies.

19. A method according to claim 18, further comprising storing the at least one RF frequency.

20. A method according to claim 18, wherein the training sequence is initiated in response to the actuation of a switch.

21. A method according to claim 18, wherein the training sequence is initiated when a signal is received by the transceiver.

22. A method according to claim 18, wherein the transceiver is mounted in a vehicle and the training sequence is initiated by a message on a vehicle bus.

23. A method according to claim 18, wherein the receiver is a tuned wideband receiver.

24. A trainable transceiver according to claim 1, wherein determining the frequency associated with the RF control signal comprises selecting the frequency from a pre-stored list of frequencies based on the determined device type.

25. A trainable transceiver according to claim 10, wherein determining the RF frequency comprises selecting the RF frequency from a pre-stored list of frequencies based on the determined device type.

26. A method according to claim 18, wherein determining the at least one RF frequency comprises selecting the at least one RF frequency from a pre-stored list of frequencies based on the determined device type.

27. A method according to claim 18, wherein the device type comprises a manufacturer of the device.

28. A method for training a transceiver to learn a set of signal characteristics of an RF control signal, the method comprising:
   initiating a training sequence;
   receiving an RF control signal from a remote control transmitter used to actuate a device, wherein a wideband receiver coupled to an antenna receives the RF control signal without scanning for the RF control signal;
   identifying and storing a control code of the RF control signal;
   identifying at least one data characteristics from a set of data characteristics for the RF control signal;
   determining a manufacturer of the device from a pre-stored list of manufacturers based on the at least one data characteristic and without scanning for and determining the carrier frequency of the RF control signal; and
   selecting a plurality of RF frequencies from a pre-stored list of frequencies based on the determined manufacturer;
   conducting a feedback-based process for determining the frequency by transmitting new RF control signals having the control code, wherein the new RF control signal transmissions are sequential and are sequenced such that the commonly used frequencies of the selected RF frequencies are interspersed with less commonly used frequencies.

* * * * *